No. 744,869.

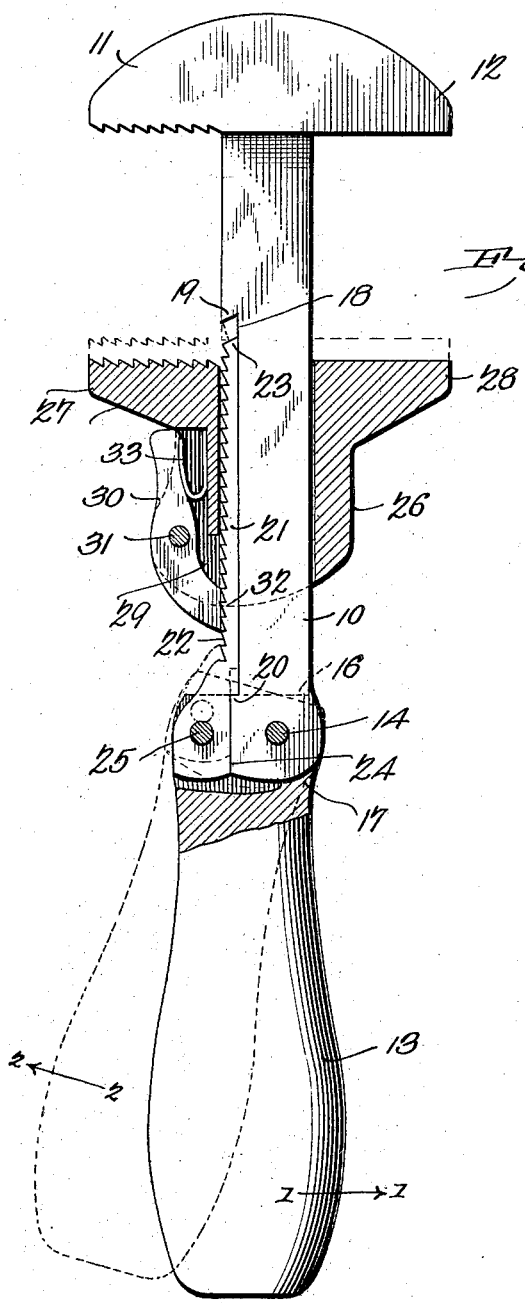
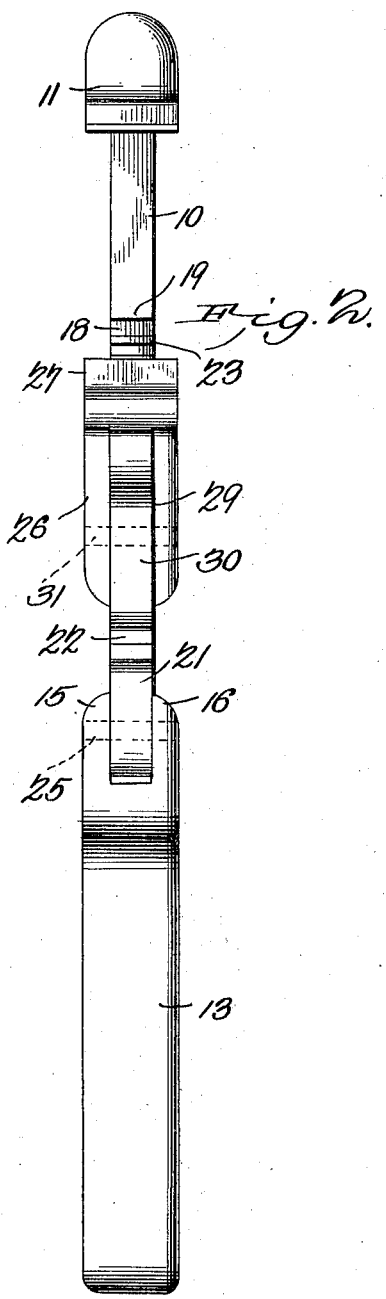

Patented November 24, 1903.

UNITED STATES PATENT OFFICE.

IRVIN MARTIN, OF DESIRE, PENNSYLVANIA, ASSIGNOR OF ONE-HALF TO RYSOME WAYNE, OF DESIRE, PENNSYLVANIA.

WRENCH.

SPECIFICATION forming part of Letters Patent No. 744,869, dated November 24, 1903.

Application filed July 3, 1903. Serial No. 164,232. (No model.)

*To all whom it may concern:*

Be it known that I, IRVIN MARTIN, a citizen of the United States, residing at Desire, in the county of Jefferson and State of Pennsylvania, have invented a new and useful Wrench, of which the following is a specification.

This invention relates to combined pipe and nut wrenches of the "quick-action" class, and has for its object to simplify and improve implements of this character and produce a device simple in construction, easily and quickly adjusted, and adapted for gripping pipes or rods or operating upon ordinary nuts without change in the structure; and the invention consists in certain novel features of construction, as hereinafter shown and described, and specified in the claim.

In the drawings illustrative of the invention, in which corresponding parts are denoted by like designating characters, Figure 1 is a sectional side elevation. Fig. 2 is a front elevation.

The improved implement consists of a stock portion 10, having a "head" at one end formed with oppositely-extending jaw members 11 12, one of which is serrated to form one side of a pipe-grip, as shown. At its lower end the stock 10 is round and has a handle member 13 pivoted thereto, as at 14, the handle member having ears 15 16, between which the stock is secured. The bottom of the recess formed by the ears is preferably curved, as at 17, concentric to the adjacent surface of the stock, so that the handle member will remain in constant contact with the stock during the entire period of its movement, as hereinafter shown. The stock 10 is provided with a longitudinal recess 18 on the same side as the serrated jaw 11, the upper end of the recess being undercut, as at 19, and the lower end formed with a shoulder 20, as shown. Within this recess 18 a bar 21 is disposed and provided with serrations or ratchet-teeth 22 in its outer surface and with an inclined end 23, corresponding to and adapted to engage the undercut end 19, and with a recess 24, corresponding to and adapted to engage the shoulder 20. The distance between the end 23 and recess 24 is less than the distance between the portions 19 and 20, so that the bar has a limited longitudinal movement in the recess 18, as shown. The pivot 14 is at one side of the center of the handle member 13, and opposite this pivotal point or at the opposite side of the handle member the bar 21 is pivoted, as at 25, between the ears 15 16. The bottom of the recess formed by the ears adjacent to the lower end of the bar 21 is spaced from the bar, as shown, so that the handle member may swing laterally, as indicated by dotted lines in Fig. 1. By this arrangement it will be obvious that when the handle member is moved into the position indicated by dotted lines in Fig. 1 the pivot 25 will move the bar 21 longitudinally in its recess until the end 23 engages the end 19, and the bottom of the recess formed by the ears 15 16 will likewise engage the lower end of the bar.

Slidably disposed upon the stock 10 and bar 21 is a movable jaw member 26, having oppositely-extending jaw portions 27 28, corresponding to the stationary portions 11 12, and one of them is serrated, as shown, to form the other side of the pipe-grip. The jaw member 26 is provided with a recess 29 in one side, in which a pawl 30 is pivoted at 31, and provided with teeth 32 at one end adapted to operate upon the teeth 22 on the bar 21 and supported yieldably by a spring 33, as shown. By this arrangement it is obvious the jaw member 26 may be quickly adjusted upon the stock and serrated bar to adapt it to the material or object to be operated on and rigidly held wherever required.

If the jaw portions 12 28 are to be employed to grasp a nut or other irregular shape, the jaw member 26 will be adjusted to fit the object and the handle member moved in the direction of the arrow 2 2 to pinch the jaw members against the object grasped, and to open the jaw members the handle is moved in the direction of the arrow 1 1, the pipe-wrench side of the implement remaining inactive during this operation.

If a pipe or rod is to be operated on, the jaw member 26 is adjusted until the surfaces 11 27 engage the object and the implement turned in the direction of the arrow 2 2, which will cause the handle member 13 to assume the position shown in dotted lines in Fig. 1 and forcibly "pinch" the jaw member 27 against the object by moving the serrated arm 21 longitudinally in the recess 18, the end 23 abutting against the portion 19 and not only preventing further movement of the bar, but likewise effectually preventing any outward movement of the bar away from the stock.

The adjustments of the jaw member 26 can be very quickly accomplished, as it can be moved outward without resistance and can be moved inward by merely releasing the pawl 30, as will be obvious.

The parts may be of any size or material, but will preferably be of iron or steel of suitable strength and will be manufactured in graduated sizes to suit the demand of the users.

Having thus described the invention, what I claim is—

A combined pipe and nut wrench comprising a stock having a head formed with oppositely-extending head portions, one of which is serrated, said stock having a longitudinal recess on the side next the serrated jaw with the outer end of the recess undercut and with a lateral shoulder near its other end, a handle member pivotally connected to said stock, a serrated bar engaging the walls of said recess and inclined at one end corresponding to the undercut end of said longitudinal recess and provided with a transverse recess corresponding to and adapted to engage said shoulder and pivotally connected to said handle member in position to be moved longitudinally of said stock by the swinging movement of said handle member, an opposing jaw member slidably disposed upon said stock and having oppositely-extending lateral jaw-faces, one of which is serrated, and a spring-controlled pawl carried by said movable jaw member and operating upon said serrated bar, substantially as specified.

In testimony that I claim the foregoing as my own I have hereto affixed my signature in the presence of two witnesses.

IRVIN MARTIN.

Witnesses:
    BLANCHE B. WILSON,
    T. A. WOLF.